US006497478B1

(12) United States Patent
Sugimoto et al.

(10) Patent No.: US 6,497,478 B1
(45) Date of Patent: Dec. 24, 2002

(54) COLOR INK JET RECORDING METHOD AND APPARATUS THEREFOR

(75) Inventors: Hitoshi Sugimoto, Yokohama; Jiro Moriyama, Kawasaki; Hiroshi Tajika; Toshiharu Inui, both of Yokohama; Kiichiro Takahashi; Fumihiro Gotoh, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,274

(22) Filed: Mar. 15, 2000

Related U.S. Application Data

(62) Division of application No. 08/998,707, filed on Dec. 29, 1997, which is a continuation of application No. 08/441,994, filed on Jun. 16, 1995, now abandoned.

(30) Foreign Application Priority Data

May 16, 1994 (JP) ........................................ 6-101001

(51) Int. Cl.[7] ........................................ G01D 11/00
(52) U.S. Cl. ........................................ 347/100; 347/101
(58) Field of Search ........................ 347/100, 43, 101, 347/96, 98

(56) References Cited

U.S. PATENT DOCUMENTS

| | | | | |
|---|---|---|---|---|
| 5,225,849 A | | 7/1993 | Suzuki et al. | 346/1.1 |
| 5,371,531 A | | 12/1994 | Rezanka et al. | 347/43 |
| 5,382,283 A | * | 1/1995 | Yui et al. | 347/100 |
| 5,395,434 A | * | 3/1995 | Tochihara et al. | 347/100 |
| 5,401,303 A | | 3/1995 | Stoffel et al. | 347/100 |
| 5,418,277 A | | 5/1995 | Ma et al. | 524/520 |
| 5,477,246 A | | 12/1995 | Hirabayashi et al. | 347/12 |
| 5,614,931 A | * | 3/1997 | Koike et al. | 347/100 |
| 5,734,403 A | | 3/1998 | Suga et al. | 347/101 |
| 5,825,377 A | | 10/1998 | Gotoh et al. | 347/15 |
| 6,007,182 A | | 12/1999 | Matsubara et al. | 347/43 |

FOREIGN PATENT DOCUMENTS

| | | |
|---|---|---|
| JP | 3-146355 | 6/1991 |

* cited by examiner

*Primary Examiner*—John Barlow
*Assistant Examiner*—Manish Shah
(74) *Attorney, Agent, or Firm*—Fitzpatrick, Cella, Harper & Scinto

(57) ABSTRACT

Disclosed is a color ink jet recording method including the step of recording a desired color image on a recording medium on the basis of recording data using a black ink and a plurality of color inks each being different from the black ink in permeating characteristics against the recording medium. In this method, the surface tension is 40 dyn/cm or less for each of the inks; and the blotting factor against plain paper is 2.5 or less for the black ink, and it is in the range of from 2.5 to 3.5 for each of the color inks. Alternatively, the surface tension is 40 dyn/cm or less for each of the inks; and the permeating rate against plain paper is one second or more for the black ink, and it is less than one second for each of the color inks.

6 Claims, 8 Drawing Sheets

FIRST SCAN

SECOND SCAN

THIRD SCAN

COLOR INK JET RECORDING METHOD AND APPARATUS THEREFOR

This a divisional application of application Ser. No. 08/998,707, filed Dec. 29, 1997, which is a continuation of application Ser. No. 08/441,994, filed Jun. 16, 1995, now abandoned.

BACKGROUND OF THE INVENTION

1. Field of the Invention

The present invention relates to a color ink jet recording method and its apparatus for recording a clear and dense color image by discharging color inks from a recording head. In particular, the present invention concerns a color ink jet recording method and its apparatus using color inks of yellow (Y), magenta (M), cyan (C), green (G), red (R), blue (B) and the like and a black (Bk) ink.

2. Related Art

The ink jet recording method in which characters, figures and the like are recorded by discharging micro-droplets of ink from discharge ports, has advantages in reducing the generation of noise, in lowering the running cost, in reducing the size of the apparatus, and in achieving the coloring. The method, therefore, has been extensively used for printers, copying machines, facsimile and the like.

In a prior art ink jet recording method, a sheet of special paper (coated paper) having an ink absorbing layer has been necessary to obtain a color image being high in color development with little bleed. Recently, a method has been practically used having a suitability for printing on sheets of commercial available "plain paper" such as high-grade/medium-grade paper and common PPC paper used for printers and copying machines in large amounts. However, in the case of color recording on a sheet of plain paper, the sufficient printing quality cannot be obtained yet. In this case, the largest problem lies in that the prevention of bleed of ink between color inks used is incompatible with the insurance of the quality of black recording, particularly, the quality of black character recording.

In recent years, to form a color image with little bleed on plain paper by an ink jet recording method, a quick drying ink having a high permeating rate against plain paper has been developed. In the color ink jet recording method, color recording is performed using inks of three colors, cyan, magenta and yellow, and further, using inks of three colors, cyan, magenta, yellow, and a black ink. In the case of using the above-described inks excellent in permeability for color ink jet recording, the recorded image has a high quality with little bleed between colors but is low in density as a whole, and further in the surroundings of the recording image area of each color, the ink is slightly bled along fibers of paper (feathering), resulting in poor sharpness.

The feathering is relatively inconspicuous in a color image area; however, it is conspicuous in a black image area, thus deteriorating the recording quality. In particular, for a black character, it is poor in sharpness and unclear, resulting in the poor recording quality.

Accordingly, to obtain a high quality black color recording less in feathering and higher in density, a black ink used for forming a black image must be of a type having a relatively low permeating rate against plain paper.

For this reason, there has been proposed an ink jet recording apparatus and its method using color inks each having a high permeating rate against paper and a black ink having a low permeating rate against paper. However, in the case of using the inks each having a high permeating rate and the ink having a low permeating rate, at the adjacent boundary portion between a black recording image area and each color recording image area, irregular blur is generated, thus significantly reducing the image quality.

The prevention of irregular blur between black and each color is incompatible with the reduction in feathering of black, and therefore, as the subject of color recording, it has been required to simultaneously achieve the prevention of bleed and the reduction in feathering of black.

Unexamined Japanese Patent HEI 3-146355 discloses a method, wherein a recording area along the boundary area between black and each color is not recorded; however, this method is disadvantageous in that the recorded data is changed.

Another method of preventing bleed of ink in a boundary area between black and each color has been known, wherein a black area along the boundary area between black and each color is formed by overlapping of color inks. In this specification, the black color thus formed is called Process Color Bk (hereinafter, abbreviated as "PCBk").

In the method of forming the black area of PCBk along the boundary area between black and each chromatic color, it is easiest to replace all black data with PCBk data of Y, M and C. Since the PCBk formed of only inks of Y, M and C, each of which is high in permeability, it is not bled at the boundary portion between black and each color. However, the PCBk is very different from the black color formed of the Bk ink in terms of hue, and thereby it is fringed by the boundary portion. For this reason, to adjust the hue of the PCBk, an attempt has been made to added the Bk ink in the black area formed of PCBk to some extent.

However, when an ink having a low permeability is adjacent to an ink having a high permeability, a blurry white image (in this specification, referred to as "white haze") is generated at the adjacent boundary portion, as shown in FIG. 7, which greatly exerts adverse effect on the image quality.

The "white haze" is considered to be generated by the following mechanism. The mechanism will be described with reference to FIGS. 8(*a*) to 8(*c*).

An ink having a low permeability is low in wettability against paper, and is generally high in surface tension. On the contrary, an ink having a high permeability is high in wettability against paper and is low in surface tension, and in general, it is added with a surface-active agent for improving the wettablity against paper. FIG. 8 shows an example wherein black ink has a low permeability and color ink has a high permeability. When an area (color ink area) recorded by the ink added with the surface-active agent for improving wettability is adjacent to an area (black ink area) recorded by the ink with no surface-active agent, as shown in FIG. 8(*a*), the surface tension of ink with no surface active agent at the adjacent boundary is lowered by the action of the surface-active agent, and further the ink with no surface-active agent is applied with internal cohesive force because of its high surface tension and tends to be moved in such a manner as to be formed in a spherical shape. Consequently, as shown in FIG. 8(*b*), the surface-active agent is spread even along the area recorded by the ink with no surface-active agent, and accordingly, when being fixed in such a state, an area with less dye is generated as shown in FIG. 8(*c*) and is recognized as the "white haze".

As a result, although the bleed of ink at the boundary area between different colors can be prevented, the image is observed as being poor by the generation of the above-described "white haze".

One example of a combination of ink compositions used in the case where the "white haze" is generated, is shown as follows.

| | | |
|---|---|---|
| 1. | Y (yellow) | |
| | C.I. Direct Yellow 86 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 2. | M (magenta) | |
| | C.I. Acid Red 289 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 3. | C (cyan) | |
| | C.I. Direct Blue 199 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 4. | Bk (black) | |
| | C.I. Direct Black 154 | 3% |
| | diethylene glycol | 10% |
| | isopropyl alcohol | 2% |
| | urea | 5% |
| | water | 80% |

Each color ink (C, M, Y) has a low surface tension of about 30 dyn/cm, and a high blotting factor against plain paper (diameter of a dot formed on a recording paper sheet/diameter of a discharged ink droplet) of nearly from 2.5 to 3.5, and accordingly, it is easier to be spread and slightly lowered in sharpness and to be permeated in paper. On the other hand, the Bk ink has a high surface tension of about 50 dyn/cm, and a low blotting factor against plain paper of nearly from 1.7 to 2.0, and accordingly, it is difficult to be spread and to be permeated in paper.

SUMMARY OF THE INVENTION

Accordingly, an object of the present invention is to solve the above-described problems, and to provide a color ink jet recording method and an apparatus therefor, wherein even when an image is recorded such that a black ink is adjacent to each color ink using an ink jet recording apparatus having the color inks each having a high permeability and the black ink having a poor permeability, an excellent color image recording with no "while haze" can be compatible with a black character image recording with less feathering due to prevention of bleed of ink between black and each color.

The above object can be achieved, according to a first aspect of the present invention, by provision of a color ink jet recording method, comprising the step of recording a desired color image on a recording medium on the basis of recording data using a black ink and a plurality of color inks each being different from the black ink in permeating characteristics against the recording medium, wherein the surface tension is 40 dyn/cm or less for each of the black ink and the color inks; and the blotting factor against plain paper is 2.5 or less for the black ink, and it is in the range of from 2.5 to 3.5 for each of the color inks.

According to a second aspect of the present invention, there is provided a color ink jet recording method, comprising the step of recording a desired color image on a recording medium on the basis of recording data using a black ink and a plurality of color inks each being different from the black ink in permeating characteristics against the recording medium, wherein the surface tension is 40 dyn/cm or less for each of the black ink and the color inks; and the permeating rate against plain paper is one second or more for the black ink, and it is less than one second for each of the color inks.

BRIEF DESCRIPTION OF THE DRAWINGS

FIG. 3(*b*) shows the state that dots are formed on a recording paper surface; and FIG. 3(*c*) shows the density distribution of the printing image formed on the paper surface;

FIG. 4(*a*) shows the state that ink droplets are discharged from a multi-nozzle recording head; FIG. 4(*b*) shows the state that dots are formed on the recording paper surface; and FIG. 4(*c*) shows the density distribution of the printing image formed on a paper surface;

FIG. 5(*a*) shows the state that ink droplets are discharged from a multi-head which scans by three times; FIG. 5(*b*) shows the state that dots are formed on the recording paper surface; and FIG. 5(*c*) shows the density distribution of the printing image formed on the paper surface;

FIG. 6(*b*) shows the image data arrangement upon the second scan; and FIG. 6(*c*) shows the image data arrangement upon the third scan;

FIG. 8(*b*) shows the phenomenon started to be generated by the contact of the inks; and FIG. 8(*c*) shows the state that the white haze is generated.

DETAILED DESCRIPTION OF THE PREFERRED EMBODIMENTS

The above-described problem can be achieved, according to the present invention, by provision of a color ink jet recording method including the step of recording a desired color image on a recording medium using a black ink and a plurality of color inks each being different from the black ink in permeating characteristics against the recording medium, wherein the black ink contains a surface-active agent and lowers a permeability against paper while each of the chromatic color inks contains a surface-active agent and enhances a permeability against paper.

In the present invention, plain paper means commercial available copying paper and bond paper such as high-grade/ medium-grade paper, and common PPC paper, which are used for printers and copying machines in large amounts.

In the present invention, the blotting factor of ink is calculated by dividing the diameter of a dot formed on a recording paper by a diameter of a discharged ink droplet. The calculation of the diameter of a dot formed on a recording paper and the diameter of a discharge ink droplet will be described in Example 1.

In the present invention, the wording "the permeating rate of ink is large" means the time elapsing between the instant when an ink dot is fully solid-printed on a plain paper sheet using an ink jet recording apparatus and when the ink permeates in the plain paper sheet until the brightness of the ink disappears, is short.

According to the present invention, there is also provided a color ink jet recording method including the step of recording a desired color image on a recording medium on the basis of recording data using a black ink and a plurality of color inks each being different from the black ink in permeating characteristics against the recording medium, wherein the method is performed using a multi-path recording technique in which the inks of different colors are recorded by scanning a plurality of recording heads each having a plurality of nozzles in a plurality of numbers while being thinned-out so as to be complementary to each other by each scan. In this recording method, the surface tension is 40 dyn/cm for each of the black ink and the color inks; and the blotting factor against plain paper is 2.5 or less for the black ink, and it is in the range of 2.5 to 3.5 for each of the chromatic color inks. Alternatively, the surface tension is 40 dyn/cm or less for each of the black ink and the color inks; and the permeating rate against plain paper is one second or more for the black ink, and is less than one second for each of the color inks.

The specific example of the multi-path recording technique will be fully described in Example 3.

The permeating characteristics of each ink in each of the above-described modes of the present invention can be adjusted by selecting the kind and/or added amount of a surface-active agent added in each ink.

Hereinafter, the present invention will be described with reference to the drawings.

Figure 1:
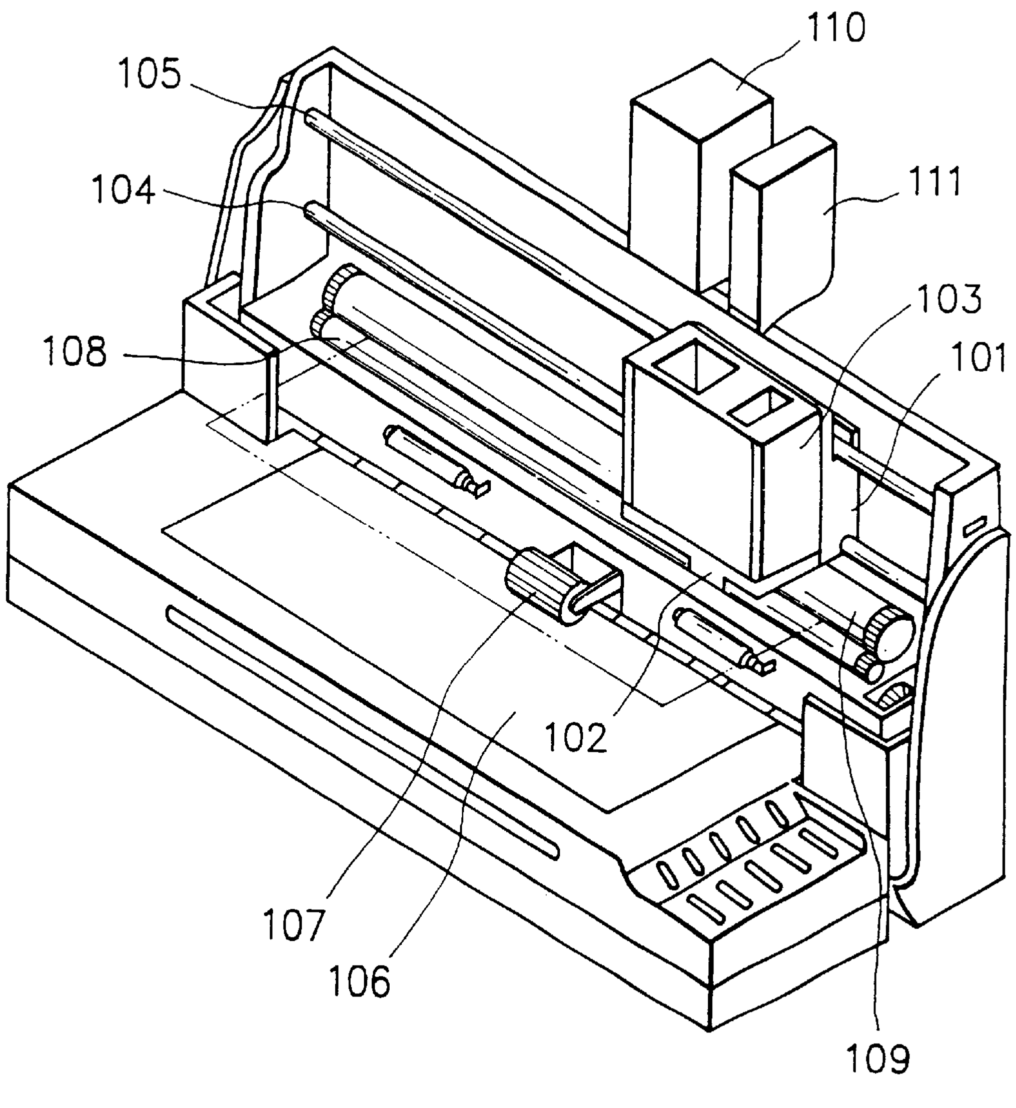
FIG. 1 is a perspective view of an ink jet recording apparatus to which the present invention is applied.

FIG. 1 is a perspective view of a recording apparatus for carrying out a color ink jet recording method of the present invention.

A carriage 101 mounts a recording head 102 and a cartridge guide 103, and is capable of scanning along guide shafts 104 and 105 (drive state: not shown).

A recording paper sheet 106 is fed in a main body of the apparatus by a feed roller 107, and it is further fed in front of a feed roller 108 while being held by the feed rollers 108 and 109, to be thus printed. Two kinds of ink cartridges, a color ink cartridge 110 containing three colors of yellow, magenta and cyan, and a black ink cartridge 111 are separately inserted in the cartridge 103 in such a manner as to be communicated to the recording head 102.

Each of inks of yellow, magenta and cyan contained in the color ink cartridge 110 is of a type in which the permeating rate against the recording paper sheet is high for preventing the bleed of ink at the boundary of colors upon formation of a color image. on the other hand, the black ink contained in the black ink cartridge 111 is of a type in which the permeating rate against a recording paper sheet is relatively lower than that of each of the above three kinds of color inks for obtaining a high quality black image being higher in density and being less in generation of feathering.

Figure 2:
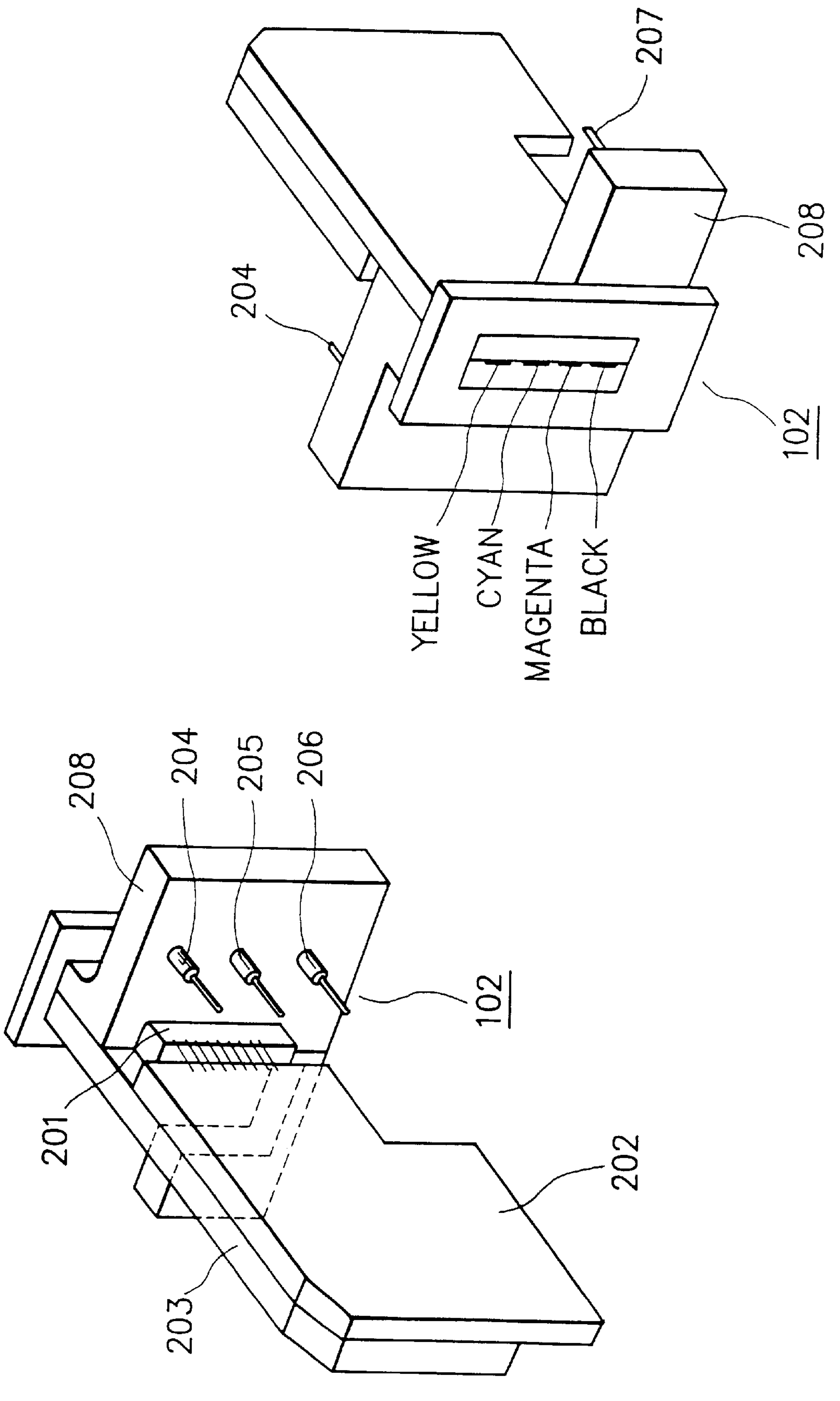
FIG. 2 is a perspective view showing the construction of a head of the ink jet recording apparatus to which the present invention is applied.

FIG. 2 is a perspective view of the recording head 102. In this figure, groups of discharge ports for yellow, magenta, cyan and black are aligned on a front surface portion of the recording head 102. Each group has 24 pieces of the discharge ports for yellow, magenta and cyan, and 64 pieces of the discharge ports for black, and an interval between colors is large than a nozzle pitch.

Each discharge port is provided with an ink liquid passage communicated to the discharge port. A common liquid chamber for supplying an ink to these liquid passages for each color is provided in the back of the portion where the ink liquid passages are disposed. In the ink liquid passage corresponding to each discharge port, an electrothermal converting body for generating a thermal energy used for discharge of an ink droplet from the discharge port and an electrode wiring for supplying a power to the electrothermal converting body are provided. These electrothermal converting bodies (discharge heaters) and electrode wirings are formed on a substrate 201 made of silicon or the like by a film forming technique. Bulkheads, top plate made of resin or glass are laminated on the substrate, to constitute the discharge ports, ink liquid passages and common chambers, and further on the rear side thereof, a drive circuit for driving the above-described electricthermal converting bodies on the basis of a recording signal is provided in the form of a printed circuit board.

Alternatively, a grooved top plate (an orifice plate) provided with bulkheads for partitioning a plurality of ink passages and common liquid chambers may be stuck on the substrate. The grooved top plate is molded, in a one body, of a common molding resin material, preferably, polysulfone.

The silicon substrate 201 and the printed circuit board 202 are provided in parallel on the same aluminum plate 203. Pipes 204 to 207 projecting in parallel to the aluminum plate 203 projects from a plastic member 208 (called distributor) vertically extending from the silicon substrate, and are communicated to the internal pass ages of the distributor which are communicated to the common liquid chambers.

The four passages for yellow, magenta, cyan and black are provided in the distributor for connecting the common liquid chambers to the pipes.

In the example shown in FIG. 2, color ink tanks and a Bk ink tank are constructed to be independently exchanged; however, a recording head of a disposable type having a printing head integrated with ink tanks may be used.

The present invention will be more fully described by way of the following examples. In a recording apparatus used in the examples, a resolution is 360 dot/inch, and a color ink in an amount of about 40 pl is discharged from each of discharge ports for yellow, magenta and cyan; while a black ink in an amount of about 80 pl is discharged from a discharge port for black.

EXAMPLE 1

One example of each ink composition used in this example is shown as follows.

| | | |
|---|---|---|
| 1. | Y (yellow) | |
| | C.I. Direct Yellow 86 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 2. | M (magenta) | |
| | C.I. Acid Red 289 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 3. | C (cyan) | |
| | C.I. Direct Blue 199 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 4. | Bk (black) | |
| | C.I. Direct Black 154 | 3% |
| | diethylene glycol | 10% |
| | isopropyl alcohol | 2% |
| | urea | 5% |
| | "Acetylenol EH" (sold by Kawaken Fine Chemical) | 0.1% |
| | water | 79.9% |

As described above, each of the ink compositions of C, M, and Y was improved in permeability against paper by the addition of "Acethylenol EH" in an amount of 1%. As the additives, the other surface-active agent, alcohol and the like may be further added. Moreover, the ink compositions of the C, M and Y are not particularly limited to those described above. On the other hand, the Bk ink was added with "Acethylenol EH" in an amount of about 0.1%. The permeability of ink can be adjusted somewhat by adjustment of the added amount of the surface-active agent. With respect to "Acetylenol EH" which is acetylene glycol added with ethylene oxide, when it is added in an amount of about 1% or more, the permeability against plain paper is significantly enhanced; while when it is added in an amount of about 1% or less, the permeability can be adjusted in accordance with the added amount. Namely, by the addition of the surface-active agent in a small amount, it becomes possible to prepare an ink having a low surface tension and a low permeability. Additionally, in the above-described Bk ink, the surface tension was about 40 dyn/cm and the blotting factor against plain paper was nearly in the range of from 2.0 to 2.5.

The blotting factor was obtained as follows. An ink droplet was discharged on a sheet of commercial available copying paper (trade name: Canon NP DRY, XEROX 4024) or bond paper (trade name: PLOVER BOND) using the above-described recording apparatus, to form a dot. The dot thus obtained was photographed by a CCD camera, and was subjected to image processing for calculating the area of the dot and converting it into a true circle. The diameter of the true circle was taken as a diameter A of the dot. On the other hand, assuming that the ink droplet is taken as a ball, a diameter B of the discharged ink droplet is calculated based on the relationship between the amount of the ink droplet ($=4/3\times\pi\times(B/2)^3$) and the diameter of the ball. The blotting factor (A/B) was thus obtained on the basis of the diameter A of the dot and the diameter B of the ink droplet.

As described above, in the ink compositions of C, M and Y, the surface tension was about 30 dyn/cm, and the blotting factor against plain paper was nearly in the range of from 2.5 to 3.5.

Here, the permeating rate of ink is defined as a time elapsing between the instant when an ink dot is fully solid-printed on a plain paper sheet and when the ink permeates in the plain paper sheet (until the brightness of the liquid disappears). The permeating rate measured on the basis of the definition was less than one second for the color ink, and was one second or more for the Bk ink.

In combination of the above-described ink compositions, the "white haze" was not recognized at the adjacent boundary surface between the Bk ink and each color ink. The reason for this is considered as follows. The addition of the surface-active agent to the Bk ink in a small amount is effective to weaken the internal cohesive strength of the Bk ink due to the reduction in surface tension and to make a difference in the surface tension between boundary area and inner area os the Bk ink small. It was revealed that the "white haze" can be suppressed by specifying the surface tension of the Bk ink at 40 dyn/cm or less, preferably, at 35 dyn/cm or less. In other words, when a difference in surface tension between blak ink and color ink is not larger than 10 dyn/cm, preferably not larger than 5 dyn/cm, the "white haze" can be suppressed. Moreover, a high quality black character image excellent in sharpness was obtained by suppressing the blotting factor of the Bk ink at about 2.5 or less.

Specific examples of the permeating agent are Aerosol OT type permeating agents; anionic surface-active agents such as sodium dodecylbenzenesulfonate, and sodium lauryl sulfate ester; and nonionic surface-active agents such as a higher alcohol added with ethylene oxide expressed by the following equation (1), alkylphenol added with ethylene oxide expressed by the following equation (2), ethylene oxide-propylene oxide copolymer expressed by the following equation (3), and acetylene glycol added with ethylene oxide expressed by the following equation (4).

However, the anionic surface-active agent is in convenient in handling because of a large foamability and further it is inferior to the nonionic surface-active agent in terms of image characteristics such as boundary bleed, color uniformity, and feathering. Therefore, the nonionic surface-active agents expressed by the following equations are more preferable.

(1)

$$R-O-(CH_2CH_2O)_n-H$$

(2)

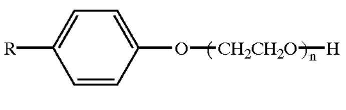

(3)

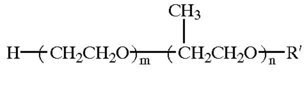

-continued (4)

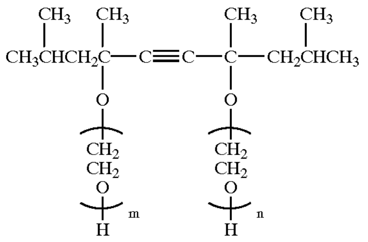

In the above-described equations, character R indicates an alkly group; R' is an alkyl group or hydrogen atom; and each of "m" and "n" is an integer.

Of the ethylene oxide type nonionic surface-active agents, the acetylene glycol added with ethylene oxide expressed by the following equation (4) is most preferable because it has a good balance of the absorbing property to an ink absorbent, image characteristics on a recording medium and discharge characteristics from the recording head. Moreover, in this compound, the hydrophilic property and permeability can be adjusted by adjustment of the additional number (m+n) of ethylene oxide. When the number (m+n) is less than 6, the permeability is excellent but the water-solubility becomes poor, that is, the solubility to ink is poor. On the other hand, the additional number of ethylene oxide is excessively large, the hydrophilic property is excessively larger but the permeability becomes low. When the number (m+n) is more than 14, the permeability is reduced, and the discharge characteristics are rather lowered. Accordingly, in this compound, the additional number of ethylene oxide is preferably in the range of from 6 to 14.

In the "Acethylenol EH" used in this example, the additional number (m+n) is 10.

The added amount of the nonionic surface-active agent is preferably 1 wt % or less, more preferably, 0.5 wt % or less for the Bk ink; while it is in the range of 0.5 to 20 wt %, preferably, in the range of 1 to 10 wt % for each color ink.

These nonionic surface-active agents may be used individually or in combination.

In general, the ink composition is further added with a recording agent such as dye, a low volatile organic solvent such as polyhydric alcohol for preventing clogging, and an organic solvent such as alcohol for achieving discharge stability and fixing performance on a recording medium.

The specific examples of the water-soluble organic solvents used in the present invention include a polyalkylene series such as polyethylene glycol and polyprophylene glycol; an alkylene glycol series in which the alkylene group contains 2–6 pieces of carbon atoms, such as ethylene glycol, propylene glycol, butylene glycol, triethylene glycol, 1,2,6-hexatriol, hexylene glycol, and diethylene glycol; a lower alkyl ether series of polyhydric alcohol such as glycerol, ethylene glycol methyl ether, diethylene glycol methyl (or ethyl) ether, and triethylene glycol monomethyl (ethyl) ether; an alcohol series such as methyl alcohol, ethyl alcohol, n-propyl alcohol, isopropyl alcohol, n-butyl alcohol, sec-buthyl alcohol, tert-butyl alcohol, isobutyl alcohol, benzil alcohol, and cyclohexanol; an amide series such as dimethyl formaldehyde and dimethyl acetoamide; a keton or keton alcohol series such as acetone and diacetone alcohol; an ether series such as tetrahydrofuran and dioxane; and a nitrogen containing cyclic compound such as N-methyl-2-pyrolidone, 2-pyrolidone, and 1,3-dimethyl-2-imidazolidinone. The water-soluble organic solvent may be added in the range not to deteriorate the image characteristics and discharge reliability. In particular, the polyhydric alcohol series and alkyl ether series of the polyhydric alcohol series are preferable, and the added amount thereof is preferably in the range of from 1 to 30 wt %.

The content of water in each ink is preferably in the range of from 50 to 90 wt %.

The specific examples of dyes used in the example include direct dye, acid dye, basic dye, reactive dye, disperse dye, and vat dye. The content of the dye is determined depending on the kind of the ink composition, characteristics required for ink and discharge amount of ink from a recording head; and in general, it is in the range of from 0.5 to 15 wt %, preferably, in the range of from 1 to 7 wt % on the basis of the whole weight of the ink.

It was revealed that the addition of thiodiglycol and urea (or the derivative thereof) in ink is effective to significantly improve the discharge characteristics and to significantly prevent the generation of clogging (adhesion). This is because, the addition thereof improves the solubility of dye in ink. The content of thiodiglycol or urea (or the derivative thereof) is preferably in the range of 1 to 30 wt %.

As the additional ink components, a viscosity adjusting agent such as polyvinylalcohol, a cellulose group, or water-soluble resin; a pH adjusting agent such as diethanolamine, triethanolamine, or a buffer solution; and an antimold may be added, as needed, in the range not to obstruct the purpose of the present invention.

To prepare inks used for an ink jet recording apparatus of a type of electrifying ink, a resistivity adjusting agent including inorganic salts, such as lithium chloride, ammonium chloride and sodium chloride may be further added.

In this example, the ink jet recording method using inks of three colors, C, M and Y and a black ink has been described; however, the present invention is not particularly limited thereto, and may be applied to a color recording method of using inks of a plurality of different colors, and to a recording method using inks of the same color having different dye concentration. Also, the ink composition is not limited to those described in this example.

EXAMPLE 2

One example of a combination of ink compositions used in this example is as follows.

| | | |
|---|---|---|
| 1. | Y (yellow) | |
| | C.I. Direct Yellow 86 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 2. | M (magenta) | |
| | C.I. Acid Red 289 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 3. | C (cyan) | |
| | C.I. Direct Blue 199 | 3% |
| | diethylene glycol | 10% |
| | isopropyl alcohol | 2% |

-continued

| | | |
|---|---|---|
| | urea | 5% |
| | "Acetylenol EH" (sold by Kawaken Fine Chemical) | 1% |
| | water | 79% |
| 4. | Bk (black) | |
| | C.I. Direct Black 154 | 3% |
| | diethylene glycol | 10% |
| | isopropyl alcohol | 2% |
| | urea | 5% |
| | "SURFLON S-113" | 0.1% |
| | water | 80% |

As described above, even in this example, each of the ink compositions of C, M, and Y was improved in permeability against paper by the addition of "Acetylenol EH" in an amount 1%. With respect to each of the above-described ink compositions, the surface tension was about 30 dyn/cm, the blotting factor against plain paper was in the range of 2.5 to 3.5, and the permeating rate was less than one second. The Bk ink was added with the fluorine based surface-active agent in an amount of about 0.1%. The fluorine based surface-active agent can achieve the effect in an amount smaller than that of the carbon based surface-active agent, and further it is relatively less in the permeability (wettability) against paper. Consequently, an ink having a low surface tension and a low permeability can be prepared by the addition of the fluorine based surface-active agent in a small amount. Additionally, in the above-described Bk ink, the surface tension was about 20 dyn/cm, the blotting factor against plain paper was-about 2.0, and the permeating rate was one second or more. The ink compositions are not limited thereto.

In combination of the above-described ink compositions, the "white haze" was not recognized at the adjacent boundary surface between the Bk ink and each color ink. The reason for this is considered as follows. The addition of the surface-active agent to the Bk ink in a small amount is effective to prevent the reduction of surface tension of black ink at the boundary area and weaken the internal cohesive strength of the Bk ink due to low surface tension. Moreover, the high quality black character image excellent in sharpness was obtained by specifying the blotting factor of the Bk ink against plain paper at about 2.5 or less.

In this Example, a difference in surface tension between Bk ink and color ink is 10 dyn/cm. The "white haze" is not generated even at the boundary area of color ink because color ink has a high permeation rate.

The specific examples of the commercial available fluorine based surface-active agents include SURFLON S-111, S-112, S-113, S-121, S-131, S-132, S-141, S-142, and S-145 (sold by Asahi Glass); and Fluorad FC-93, FC-95, FC-98, FC-124, FC-135, FC-170C, FC-430, and FC-431 (sold by 3M). These materials may be added individually or in combination. The fluorine based surface-active agent may be used in combination of the carbon based surface-active agent such as acetylene glycol added with ethylene oxide.

EXAMPLE 3

In an ink jet recording apparatus having a multi-nozzle recording head, there has been known a multi-path recording technique for preventing uneven image density due to variations in the discharged amounts of inks from multiple nozzles and in the discharge directions of the inks and bleed at the boundary portion between different colors. First, this technique will be described.

Different from the case of printing only characters by a monochrome printer, for printing a color image, various factors such as color reproduction, tone and uniformity must be adjusted. In particular, from the viewpoint of uniformity, a slight variation in size for each nozzle caused in a multi-head manufacturing process exerts adverse effect, upon printing, on the amount of an ink discharged from each nozzle and the discharge direction thereof, to generate uneven image density of the printing image, thus finally deteriorating the image quality.

Figure 3A:
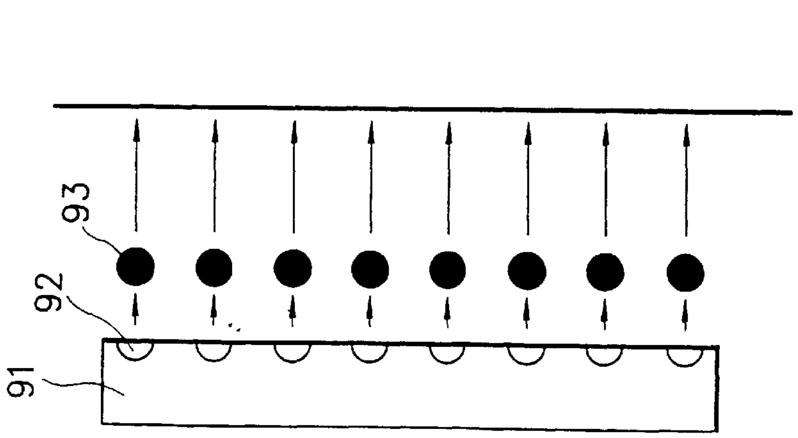
FIGS. 3(*a*), 3(*b*) and 3(*c*) are views showing an ideal printing state obtained by the ink jet recording apparatus, wherein FIG. 3(*a*) shows the state that ink droplets are discharged from a multi-nozzle recording head.
Figure 3B:
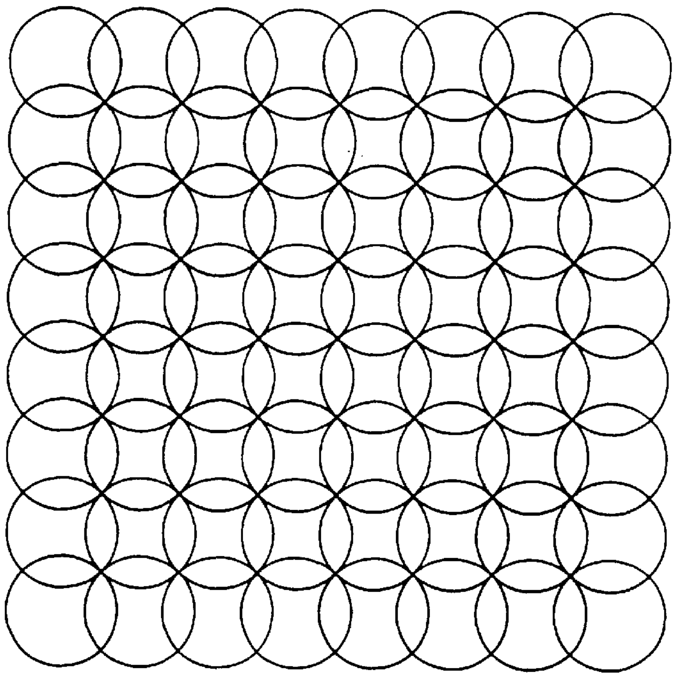
Figure 3C:
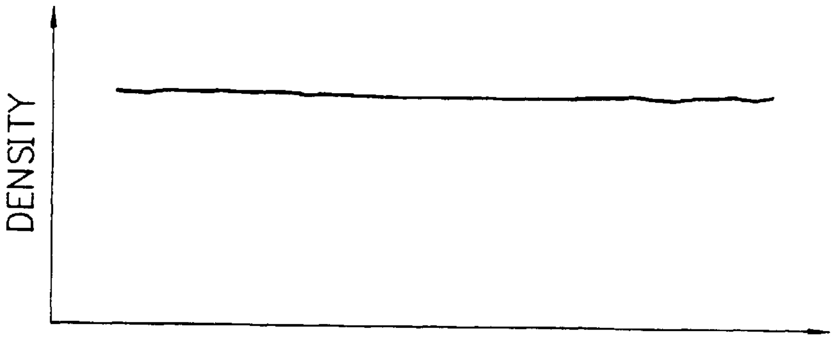
Figure 4C:
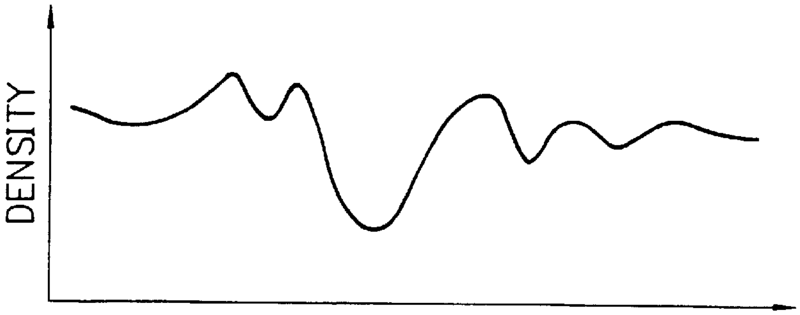
FIGS. 4(*a*), 4(*b*) and 4(*c*) are views showing a printing state having uneven image density obtained by the ink jet recording apparatus.
Figure 4B:
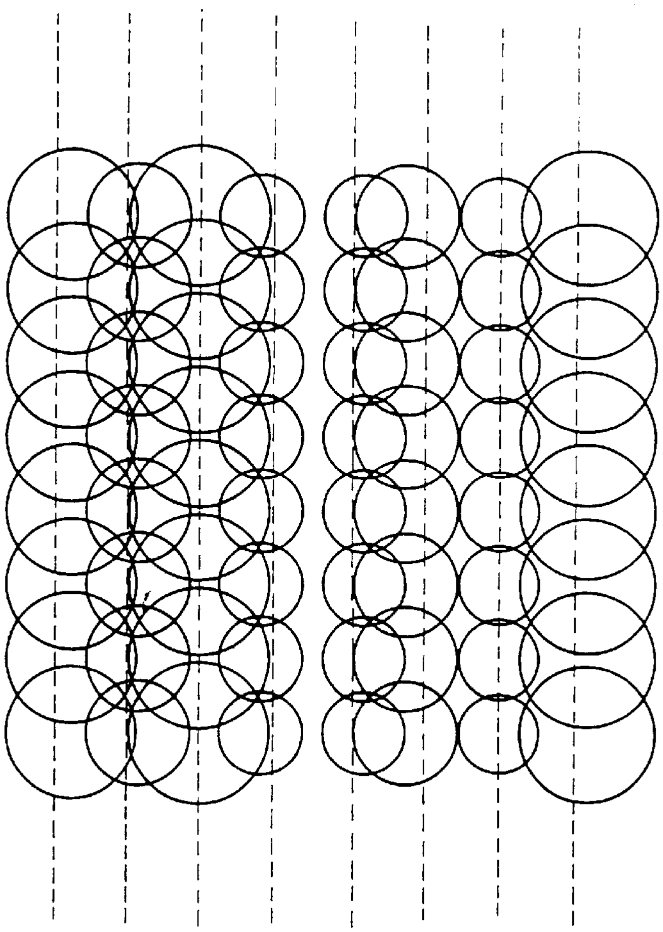
Figure 4A:
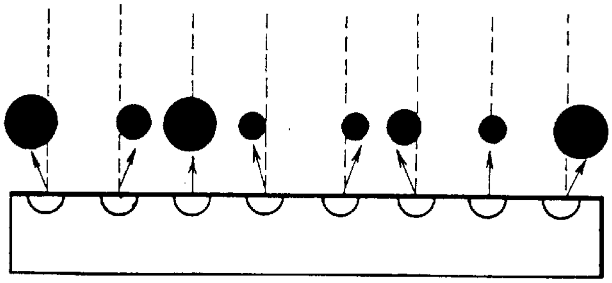

The specific example will be described with reference to FIGS. 3(*a*) to 3(*c*) and FIGS. 4(*a*) to 4(*c*). In FIG. 3(*a*), reference numeral 91 indicates a multi-head. Here, for convenience, it is assumed that the multi-head 91 has eight pieces of multiple nozzles 92. Reference numeral 93 indicates ink droplets discharged from the multiple nozzles 92. From an idealistic viewpoint, as shown in the figure, each ink in the equal amount is discharged in the equal direction. In this case, each dot having the equal size is formed on a paper sheet as shown in FIG. 3(*b*), and as a whole, a uniform image without uneven image density shown in FIG. 3(*c*) can be obtained. However, actually, each nozzle has a variation in size, and accordingly, as shown in FIG. 4(*a*), each ink droplet discharged from each nozzle has variations in the size and in the direction, and is jetted on the paper sheet as shown in FIG. 4(*b*). As is apparent from this figure, with respect to a head main scanning direction, light image areas in which the area factor cannot be perfectly satisfied are periodically generated; dots are excessively overlapped; or white streaks, for example shown at the center of the figure, are generated. The group of the dots formed on the paper sheet in the above-described state exhibit a density distribution shown in FIG. 4(*c*) relative to the nozzle arrangement direction. Such a uneven density distribution is observed as the uneven image density.

Figures 5A, 5B, 5C:
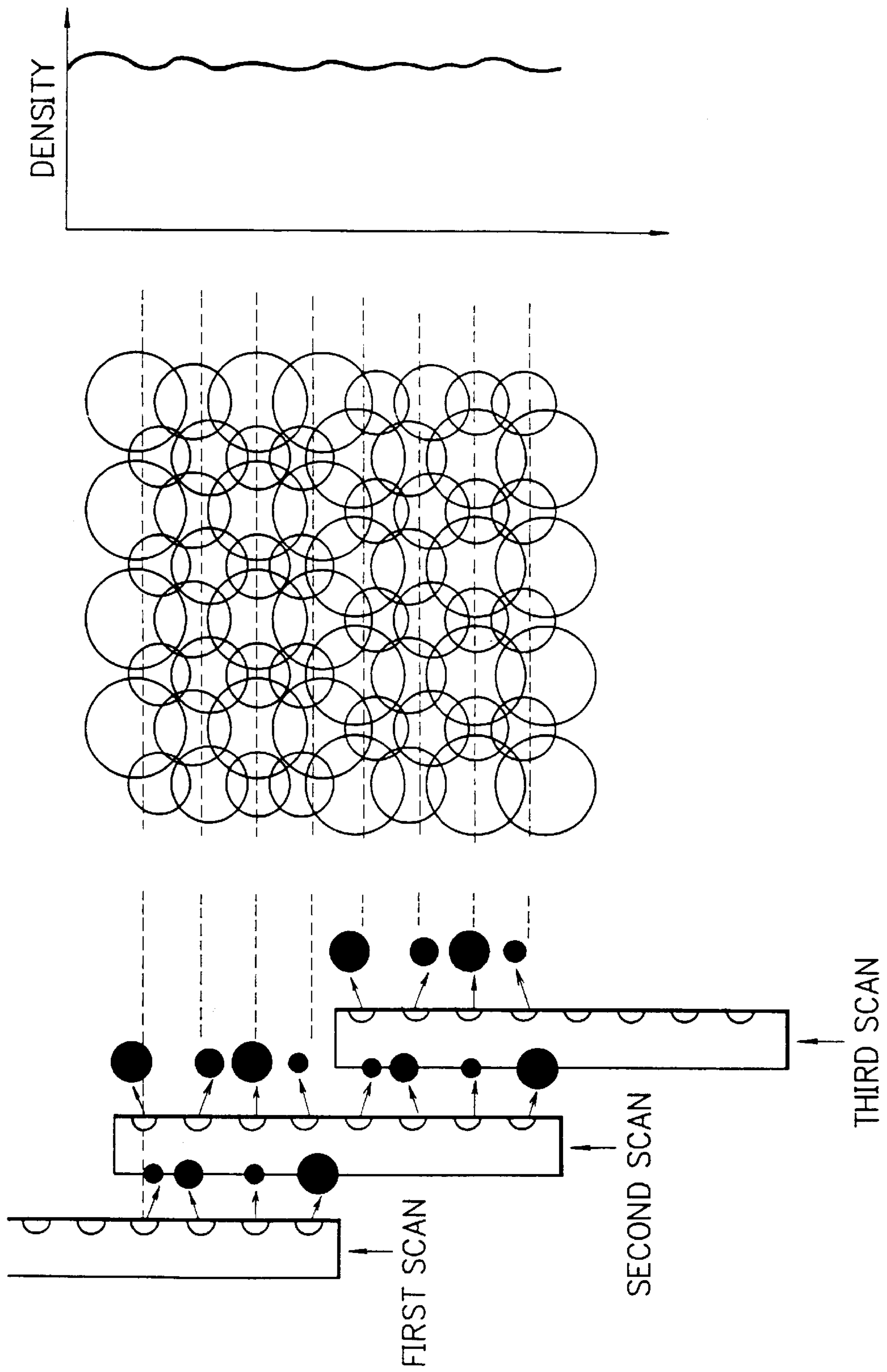
FIGS. 5(*a*), 5(*b*) and 5(*c*) are views for illustrating the reduction in uneven image density by a multi-path recording technique.
Figure 6A:
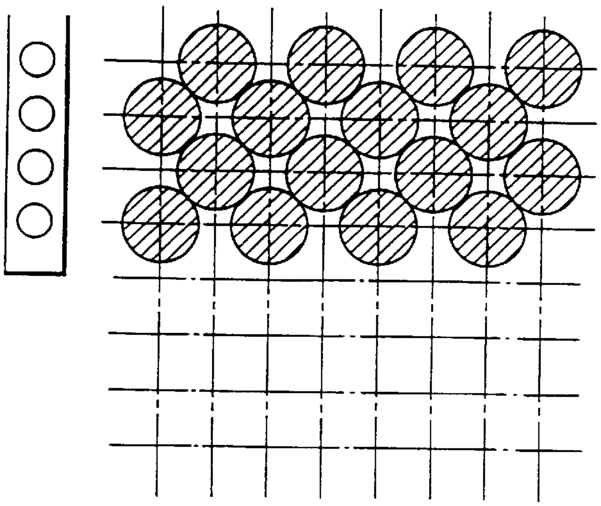
FIGS. 6(*a*), 6(*b*) and 6(*c*) are views for illustrating an image data arrangement example for reducing uneven image density by the multi-path recording technique; wherein FIG. 6(*a*) shows the image data arrangement upon the first scan.
Figure 6B:
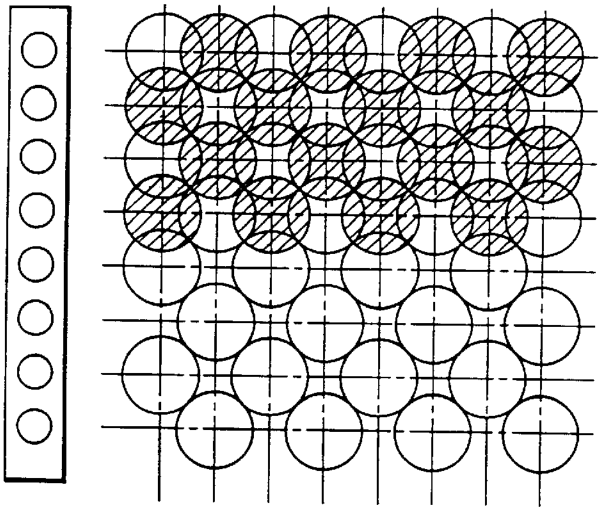
Figure 6C:
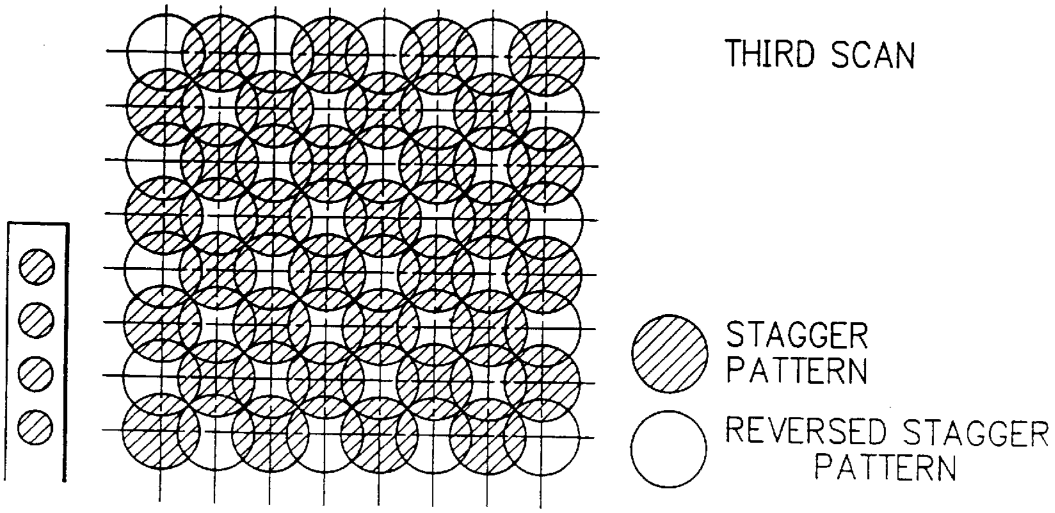
Figure 7:
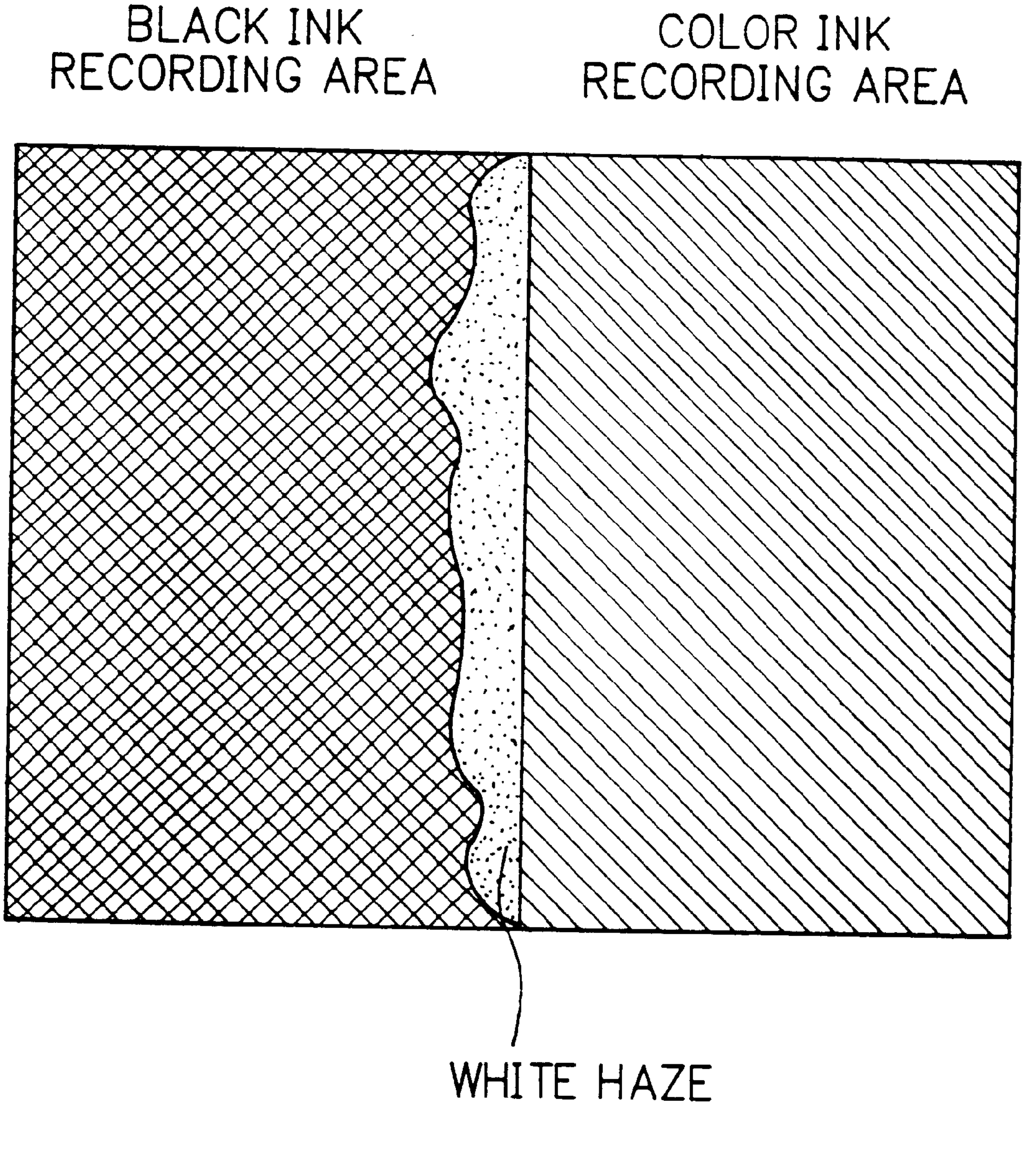
FIG. 7 is a view showing a "white haze" phenomenon generated on a recording medium.
Figure 8:
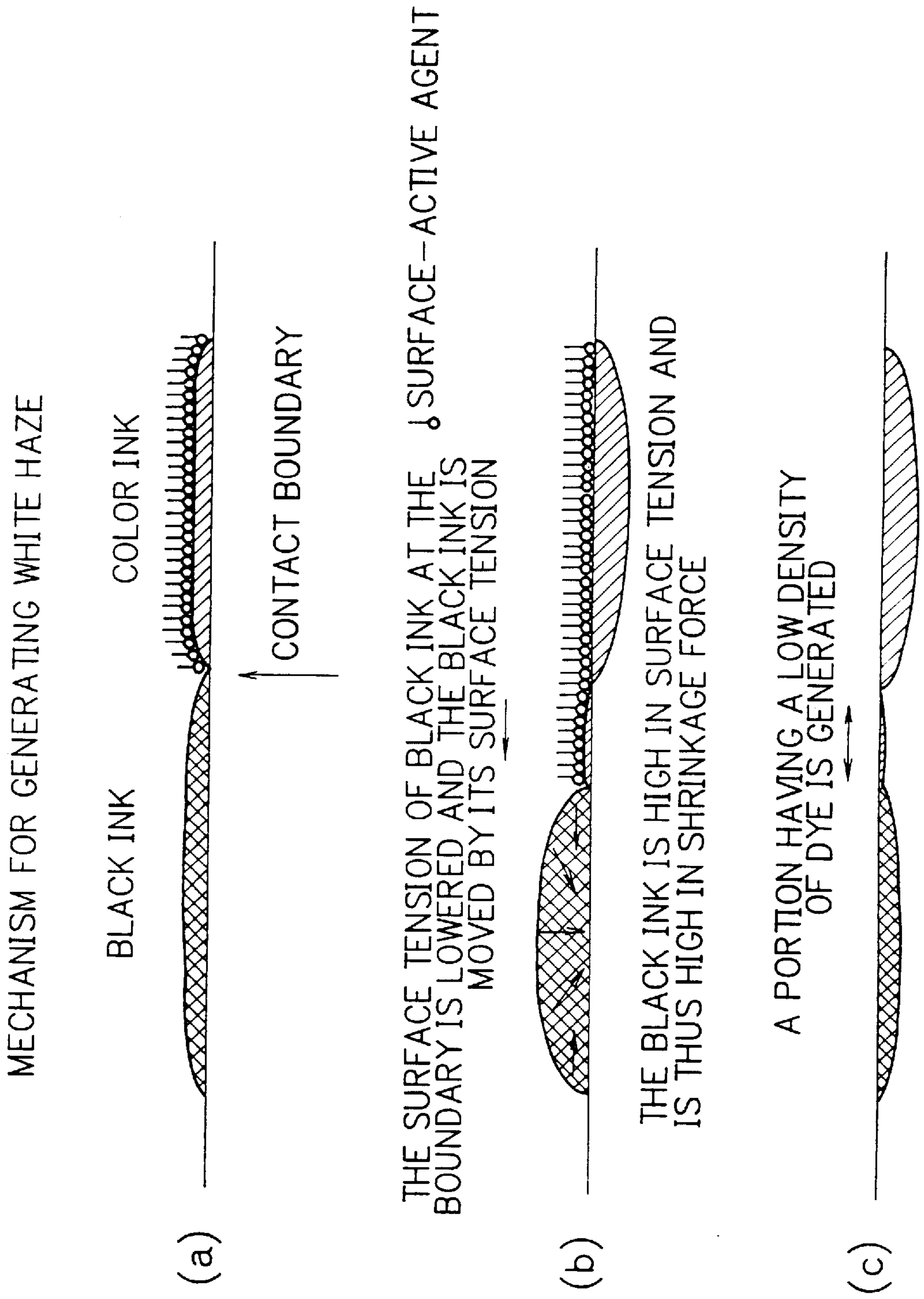
FIGS. 8(*a*), 8(*b*) and 8(*c*) are views for illustrating the mechanism generating the white haze; wherein FIG. 8(*a*) shows the state that a black ink with no surface-active agent is just contacted with each color ink having a surface-active agent.

To prevent the above-described uneven image density, the method shown in FIGS. 5(*a*) to 5(*c*) and FIGS. 6(*a*) to 6(*c*) has been proposed. As shown in these figures, the multi-head 91 is scanned by three times for completing the printing area shown in FIG. 3(*b*) or 4(*b*), wherein the half area of a four pixel unit is completed through two paths. In this case, the eight nozzles of the multi-head are divided into the four upper nozzles and the four lower nozzles. At the first scan, the dots printed by each nozzle is equivalent to part of the specified image data thinned-out by about half in accordance with a specified pattern arrangement, and at the second scan, the dots equivalent to the remaining half pattern are printed, thus completing the printing area of the four pixel unit. Hereinafter, this method is referred to as "division recording technique".

With this recording method, even using a multi-head having the same variation as that of the multi-head shown in FIG. 4(*a*), the effect of each nozzle on the printing image is reduced by half, thereby obtaining the printed image shown in FIG. 5(*b*), in which the black and white streaks shown in FIG. 4(*b*) becomes relatively inconspicuous. Consequently, as shown in FIG. 5(*c*), the uneven image density is relatively lowered as compared with the case shown in FIG. 4(*c*).

In performing the above-described recording, at the first and second scans, the pattern is divided into complementary parts in accordance with a specified arrangement. In general, the pattern arrangement (thinning-out pattern) is performed such that dots a stagger lattice is formed at vertical and horizontal pixels as shown in FIGS. 6(*a*) and 6(*c*). Accordingly, in the unit printing area (here, four pixel unit), the printing is completed by the first scan printing based on the stagger lattice pattern and the second scan printing based on the reversed stagger lattice pattern. FIGS. 6(*a*), 6(*b*) and 6(*c*) are views, similar to FIGS. 3(*b*), 4(*b*) and 5(*b*), for illustrating how the recording is completed by the multi-head having the eight nozzles in a specified area on the basis of the stagger lattice pattern and the reversed stagger lattice pattern. At the first scan, the recording is performed by the four lower nozzles on the basis of the stagger lattice patter (see FIG. 6(*a*)). At the second scan, the paper is fed by the four pixels (½ of the head length) and the recording is performed on the basis of the reversed stagger lattice pattern (see FIG. 6(*b*)). Moreover, at the third scan, the paper is fed again by the four pixels (½ of the head length), and the recording is performed again on the basis of the stagger lattice pattern (see FIG. 6(*c*)). Thus, by sequentially feeing the paper sheet for each four pixels and alternately performing recording on the basis of the stagger lattice pattern or the reversed stagger lattice pattern, the recording area of the four pixel unit is completed for each scan. As described above, the printing is completed by two different nozzles in the same area, thereby making it possible to obtain a high quality image without uneven image density.

In this example, the ink jet recording is performed using the division recording technique. A combination of ink compositions used in this example is as follows.

| | | |
|---|---|---|
| 1. | Y (yellow) | |
| | C.I. Direct Yellow 86 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 2. | M (magenta) | |
| | C.I. Acid Red 289 | 3% |
| | diethylene glycol | 10% |
| | isopropyl alcohol | 2% |
| | urea | 5% |
| | "Acetylenol EH" (sold by Kawaken Fine Chemical) | 1% |
| | water | 79% |
| 3. | C (cyan) | |
| | C.I. Direct Blue 199 | 3% |
| | diethylene glycol | 10% |
| | isopropyl alcohol | 2% |
| | urea | 5% |
| | "Acetylenol EH" (sold by Kawaken Fine Chemical | 1% |
| | water | 79% |
| 4. | Bk (black) | |
| | C.I. Direct Black 154 | 3% |
| | diethylene glycol | 10% |
| | isopropyl alcohol | 2% |
| | urea | 5% |
| | "SURFLON S-113" | 0.1% |
| | "Acetylenol EH" | 0.02% |
| | water | 79.88% |

As described above, even in this example, each of the ink compositions of C, M, and Y was improved in permeability against paper by the addition of "Acetylenol EH" in an amount of 1%. With respect to each of the above-described ink compositions, the surface tension was about 30 dyn/cm, the blotting factor against plain paper was nearly in the range of 2.5 to 3.5, and the permeating rate was less than one second. The Bk ink was added with the fluorine based surface-active agent in an amount of about 0.1% and the "Acetylenol EH" in an amount of 0.02%. The fluorine based surface-active agent can achieve the effect in an amount smaller than that of the carbon based surface-active agent, and further it is relatively less in the permeability (wettability) against paper. Consequently, an ink having a low surface tension and a low permeability can be prepared by the addition of the fluorine based surface-active agent in a small amount. Additionally, in the above-described Bk ink, the surface tension was about 20 dyn/cm, the blotting factor against plain paper was about 2.5, and the permeating rate was one second or more. The ink compositions are not limited thereto.

In combination of the above-described ink compositions, the "white haze" was not recognized at the adjacent boundary surface between the Bk ink and each color ink. The reason for this is considered as follows. The addition of the surface-active agent to the Bk ink in a small amount is effective to prevent the reduction of surface tension of black ink at the boundary area and to weaken the internal cohesive strength of the Bk ink due to low surface tension. In this Example, a difference in surface tension between Bk ink and color ink is 10 dyn/cm. Moreover, the high quality black character image excellent in sharpness was obtained by specifying the blotting factor of the Bk ink against plain paper at about 2.5 or less.

Since the amount of the ink discharged for each scan is reduced, the amount of the Bk ink adjacent to each color ink at one time is reduced, thus effectively reducing the "white haze". Accordingly, it becomes possible to prevent the bleed at the boundary between different colors and to simultaneously obtain a high quality color image recording and a high quality black character image recording. Moreover, the method may be performed in combination of the process Bk recording method for forming a black image area by overlapping a plurality of color ink dots (black is formed by ink dots of C, M and Y or C, M, Y and Bk).

According to the present invention, in an ink jet recording method using each color ink excellent in permeability and a Bk ink poor in permeability, the "white haze" liable to deteriorate the image at the boundary between each color image area and a black image area can be eliminated. This makes it possible to realize a high recording quality less in feathering in a black image area and a high recording quality without any disturbance at the adjacent surface between black and each color, and hence to simultaneously realize a high quality black recording and a high quality color recording.

What is claimed is:

1. A black ink for forming a multi-color image on a recording medium together with a color ink, said multi-color image containing a black image and a color image adjacent said black image, wherein said black ink has less permeability against said recording medium than said color ink, and said black ink has a smaller surface tension than that of said color ink.

2. A black ink according to claim 1, further comprising a fluorine-based surface-active agent.

3. An ink set for forming a multi-color image on a recording medium, comprising a black ink for ink-jet recording and a color ink for ink-jet recording, wherein said black ink has less permeability against said recording medium than said color ink, and said black ink has a smaller surface tension than that of said color ink.

4. An ink set according to claim 3, wherein each of said black ink and said color ink contain a surface-active agent.

5. An ink set according to claim 4, wherein said surface-active agent contained in said black ink is a fluorine-based surface-active agent and said surface-active agent contained in said color ink is a nonionic surface-active agent.

6. An ink set according to claim 3, wherein said black ink has a permeating rate against plain paper of one second or more, and said color ink has a permeating rate against plain paper of less than one second.

* * * * *

UNITED STATES PATENT AND TRADEMARK OFFICE

CERTIFICATE OF CORRECTION

PATENT NO. : 6,497,478 B1
DATED : December 24, 2002
INVENTOR(S) : Hitoshi Sugimoto et al.

It is certified that error appears in the above-identified patent and that said Letters Patent is hereby corrected as shown below:

Title page,
Item [62], Related U.S. Application Data, "Jun. 16, 1995," should read -- May 16, 1995, --.

Column 1,
Line 5, "1997, which" should read -- 1997, now U.S. Patent No. 6,050,676 issued on April 18, 2000, which --; and
Line 6, "Jun. 16, 1995," should read -- May 16, 1995, --.

Column 2,
Line 45, "is added with" should read -- contains as an additive --.

Column 5,
Line 67, "on" should read -- On --.

Column 6,
Line 31, "electrictheramal" should read -- electrothermal --;
Line 43, "projects" should read -- project --; and
Line 45, "pass ages" should read -- passages --.

Column 7,
Line 37, "was added with" should read -- contained --;
Line 40, "added" should be deleted;
Line 41, "oxide," should read -- oxide added, --; and
Line 54, "commercial" should read -- commercially --.

Column 8,
Line 29, "blak" should read -- black --.

Column 9,
Line 14, "alkly" should read -- alkyl --;
Line 52, "pieces of" should be deleted;
Line 61, "benzil" should read -- benzyl --; and
Line 63, "keton" should read -- ketone --.

Column 11,
Line 17, "1%." should read -- of 1%. --.

UNITED STATES PATENT AND TRADEMARK OFFICE

CERTIFICATE OF CORRECTION

PATENT NO. : 6,497,478 B1 
DATED : December 24, 2002
INVENTOR(S) : Hitoshi Sugimoto et al.

It is certified that error appears in the above-identified patent and that said Letters Patent is hereby corrected as shown below:

Column 12,
Line 1, "Different from" should read -- In contrast to --;
Line 55, "becomes" should read -- become --;
Line 63, "dots a stagger lattice" should read -- a stagger lattice of dots --; and
Line 65, "(here," should read -- (here, a --.

Column 13,
Line 7, "patter" should read -- pattern --.

Signed and Sealed this

Nineteenth Day of July, 2005

JON W. DUDAS
*Director of the United States Patent and Trademark Office*